(12) United States Patent
Wu et al.

(10) Patent No.: US 10,984,222 B2
(45) Date of Patent: Apr. 20, 2021

(54) METHOD, APPARATUS AND SYSTEM FOR 3D FACE TRACKING

(71) Applicant: Microsoft Technology Licensing, LLC, Redmond, WA (US)

(72) Inventors: Hsiang-Tao Wu, Beijing (CN); Xin Tong, Beijing (CN); Yangang Wang, Beijing (CN); Fang Wen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/309,817

(22) PCT Filed: Jul. 12, 2016

(86) PCT No.: PCT/CN2016/089831
§ 371 (c)(1),
(2) Date: Dec. 13, 2018

(87) PCT Pub. No.: WO2018/010101
PCT Pub. Date: Jan. 18, 2018

(65) Prior Publication Data
US 2019/0332846 A1 Oct. 31, 2019

(51) Int. Cl.
*G06K 9/00* (2006.01)
*G06T 7/55* (2017.01)
*G06T 17/20* (2006.01)

(52) U.S. Cl.
CPC ..... *G06K 9/00208* (2013.01); *G06K 9/00228* (2013.01); *G06K 9/00268* (2013.01); *G06T 7/55* (2017.01); *G06T 17/20* (2013.01)

(58) Field of Classification Search
CPC .......... G06K 9/00208; G06K 9/00228; G06K 9/00268; G06T 7/55; G06T 17/20
See application file for complete search history.

(56) References Cited

U.S. PATENT DOCUMENTS 6,492,986 B1 * 12/2002 Metaxas ............ G06K 9/00335
345/420
6,556,196 B1 4/2003 Blanz et al.
(Continued)

FOREIGN PATENT DOCUMENTS

| CN | 103093490 A | 5/2013 |
| CN | 103942822 A | 7/2014 |

(Continued)

OTHER PUBLICATIONS

"Bilateral Filter", Retrieved from: https://en.wikipedia.org/wiki/Bilateral_filter, Dec. 9, 2019, 4 Pages.
(Continued)

*Primary Examiner* — Mark Roz
(74) *Attorney, Agent, or Firm* — Schwegman Lundberg & Woessner, P.A.

(57) ABSTRACT

The present disclosure provides method, apparatus and system for 3-dimension (3D) face tracking. The method for 3D face tracking may comprise: obtaining a 2-dimension (2D) face image; performing a local feature regression on the 2D face image to determine 3D face representation parameters corresponding to the 2D face image; and generating a 3D facial mesh and corresponding 2D facial landmarks based on the determined 3D face representation parameters. The present disclosure may improve tracking accuracy and reduce memory cost, and accordingly may be effectively applied in broader application scenarios.

19 Claims, 3 Drawing Sheets

(56) References Cited

U.S. PATENT DOCUMENTS

| | | | |
|---|---|---|---|
| 7,856,125 | B2 | 12/2010 | Medioni et al. |
| 8,797,328 | B2 | 8/2014 | Corazza et al. |
| 8,879,804 | B1 | 11/2014 | Konoplev et al. |
| 9,111,134 | B1 | 8/2015 | Rogers et al. |
| 2013/0287294 | A1 | 10/2013 | Ye et al. |
| 2015/0035825 | A1 | 2/2015 | Zhou et al. |
| 2015/0169938 | A1 | 6/2015 | Yao et al. |
| 2015/0243031 | A1 | 8/2015 | Narasimha et al. |
| 2016/0055368 | A1 | 2/2016 | Cao et al. |

FOREIGN PATENT DOCUMENTS

| | | |
|---|---|---|
| CN | 105528805 A | 4/2016 |
| WO | 2015139231 A1 | 9/2015 |

OTHER PUBLICATIONS

Blanz, et al., "Reanimating Faces in Images and Video", In Proceedings of the Computer Graphics Forum, vol. 22, Issue 3, Sep. 2003, 10 Pages.

Cao, et al., "3D Shape Regression for Real-time Facial Animation", In Journal of the ACM Transactions on Graphics, vol. 32, Issue 4, Jul. 1, 2013, 10 Pages.

Ming, et al., "Robust 3D Face Recognition using Learn Correlative Features", In Proceedings of the IEEE 10th International Conference on Signal Processing, Oct. 24, 2010, pp. 1382-1385.

Schaefer, et al., "Image Deformation using Moving Least Squares", In Journal of ACM Transactions on Graphics, vol. 25, Issue 3, Jul. 2006, pp. 533-540.

Shi, et al., "Deep Regression for Face Alignment", In Journal of the Computing Research Repository, Sep. 18, 2014, 9 Pages.

Vlasic, et al., "Face Transfer with Multilinear Models", In Proceedings of the ACM SIGGRAPH 2005 Papers, Jul. 10, 2005, 10 Pages.

Wang, et al., "LIBLINEAR—A Library for Large Linear Classification", Retrieved from: https://www.csie.ntu.edu.tw/~cjlin/liblinear/, Dec. 9, 2019, 3 Pages.

Xiao, et al., "Facial Landmark Detection via Progressive Initialization", In Proceedings of the IEEE International Conference on Computer Vision Workshop, Dec. 7, 2015, pp. 986-993.

Zhu, et al., "Software for Large-scale Bound-constrained Optimization (L-BFGS-B)", Retrived from:http://users.iems.northwestern.edu/~nocedal/lbfgsb.html, Apr. 22, 2015, 2 Pages.

Cao, et al., "Displaced Dynamic Expression Regression for Real-time Facial Tracking and Animation", In Journal of ACM Transactions on Graphics vol. 33, Issue 4, Jul. 27, 2014, 10 pages.

"International Search Report and Written Opinion Issued in PCT Application No. PCT/CN2016/089831", dated Apr. 7, 2017, 11 Pages.

Ren, et al., "Face Alignment at 3000 FPS Via Regressing Local Binary Features", In Proceedings of the IEEE Conference on Computer Vision and Pattern Recognition, Jun. 23, 2014, pp. 1-8.

Renming, et al., "Facial Landmarks Location Based on Random Forest Regression", (w/ English Abstract), In Journal of Electronic Measurement and Instrumentation, vol. 30, Issue 5, May 15, 2016, 4 Pages.

\* cited by examiner

METHOD, APPARATUS AND SYSTEM FOR 3D FACE TRACKING

CROSS-REFERENCE TO RELATED APPLICATIONS

This application is a U.S. National Stage Filing under 35 U.S.C. 371 of International Patent Application Serial No. PCT/CN2016/089831, filed Jul. 12, 2016, and published as WO 2018/010101 A1 on Jan. 18, 2018, which application and publication are incorporated herein by reference in their entirety.

BACKGROUND

Recently, real-time 3-dimension (3D) face tracking techniques have been studied and developed to a certain extent. However, it is still a challenge for these existing real-time 3D face tracking techniques to provide fully satisfied tracking accuracy. According to these techniques, memory costs for performing tracking are usually high. Furthermore, these techniques are often restricted by utilizing a RGB-Depth (RGB-D) camera for inputting face images.

SUMMARY

The present disclosure proposes utilizing a local feature regression for real-time 3D face tracking. It may reconstruct human being's 3D face with a general RGB video camera. Implementations in accordance with the present disclosure may use local features to learn a small but better regression random forest and further use this random forest to perform a local feature regression. Accordingly, it may improve tracking accuracy and reduce memory cost. Benefiting from the improved tracking accuracy, the reduced memory cost and the use of a general RGB video camera, the implementations in accordance with the present disclosure may be effectively applied in broader application scenarios, such as, Game studio, face related mobile phone applications, etc.

In one aspect, the present disclosure provides a method for 3D face tracking. The method may comprise: obtaining a 2-dimension (2D) face image; performing a local feature regression on the 2D face image to determine 3D face representation parameters corresponding to the 2D face image; and generating a 3D facial mesh and corresponding 2D facial landmarks based on the determined 3D face representation parameters.

In another aspect, the present disclosure provides an apparatus for 3D face tracking. The apparatus may comprise: an obtaining module for obtaining a 2D face image; a regression performing module for performing a local feature regression on the 2D face image to determine 3D face representation parameters corresponding to the 2D face image; and a generating module for generating a 3D facial mesh and corresponding 2D facial landmarks based on the determined 3D face representation parameters.

In another aspect, the present disclosure provides a system for 3D face tracking. The system may comprise one or more processors and a memory. The memory may store computer-executable instructions that, when executed, cause the one or more processors to perform any steps of the method for 3D face tracking according to various aspects of the present disclosure.

In another aspect, the present disclosure provides a non-transitory computer-readable medium. The non-transitory computer-readable medium may comprise instructions that, when executed, cause one or more processors to perform any steps of the method for 3D face tracking according to various aspects of the present disclosure.

It should be noted that the above one or more aspects comprise the features hereinafter fully described and particularly pointed out in the claims. The following description and the drawings set forth in detail certain illustrative features of the one or more aspects. These features are only indicative of a few of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
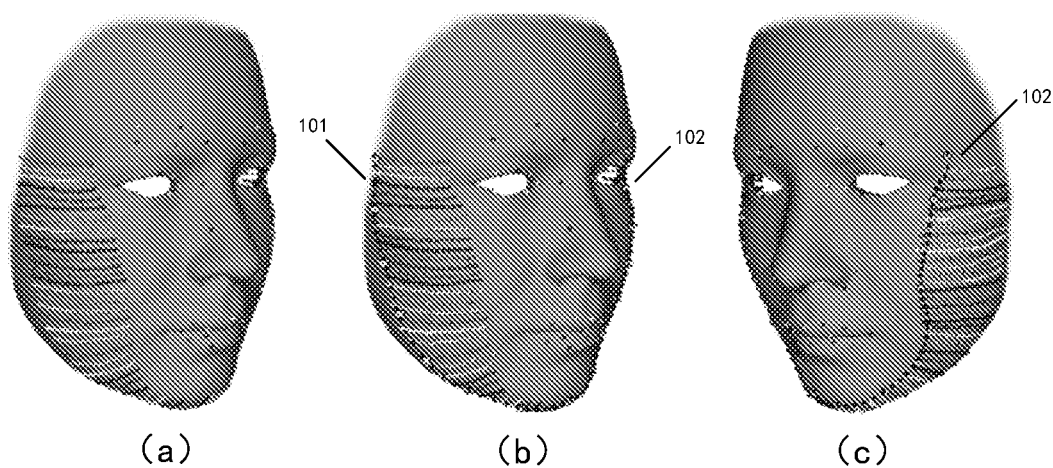
FIG. 1 illustrates an exemplary implementation for obtaining contour vertices according to an embodiment of the present disclosure.

The present disclosure will now be discussed with reference to several example implementations. It is to be understood these implementations are discussed only for enabling those skilled persons in the art to better understand and thus implement the embodiments of the present disclosure, rather than suggesting any limitations on the scope of the present disclosure.

Embodiments of the present disclosure may provide method, apparatus and system for performing 3D face tracking. For example, a single RGB video camera may be used for obtaining 2D face images. The obtained 2D face images may be inputted into a computing mechanism according to the present disclosure. The computing mechanism may include any types of computing units, such as general computing units or mobile computing devices, that are configured for performing a local feature regression according to the present disclosure. The local feature regression may be applied on the 2D face images by the computing mechanism, so as to generate 3D facial meshes and corresponding 2D facial landmarks. The generated 3D facial mesh and corresponding 2D facial landmarks may be alternatively presented on a display screen. Thus, a 3D face tracking process from 2D face images to 3D facial meshes and corresponding 2D facial landmarks may be achieved.

The computing mechanism may generally comprise a regression model training system and a regression model application system. In accordance with implementations of the present disclosure, performing 3D face tracking may comprise two phases: regression model training phase and regression model application phase.

During the regression model training phase, the regression model training system may be configured to receive training data and generate a regression model based on the training data. The training data may be a dataset including training face images, guessed and corresponding ground truth shape vector pairs, etc. The regression model for performing 3D face tracking may be generated by the regression model training system based on the training data. The regression model may be further used for establishing a mapping relationship between a 2D face image and a 3D facial mesh.

During the regression model application phase, the regression model application system may be configured to receive input 2D face images, and perform a local feature regression based on the trained regression model and the input. The local feature regression may determine 3D face representation parameters corresponding to the 2D face images, so as to generate 3D facial meshes and corresponding 2D facial landmarks.

It is to be understood that the exemplary environment described above is only for the purpose of illustration without suggesting any limitations as to the scope of the present disclosure. The present disclosure can be embodied with a different structure and/or functionality.

Some embodiments of the present disclosure adopt a 3D face representation model. According to this model, a 3D facial mesh F may be represented as:

$$F = R(Be^T + b_0) + T \qquad \text{Equation (1)}$$

where B is a blendshape basis matrix corresponding to a person in a face image, $b_0$ represents a neutral face, e is an expression coefficient vector, R is a rigid rotation quaternion, and T is a rigid translation vector.

The blendshape basis matrix B is a linear combination of expression blendshapes, and may be represented as $B=[b_1, \ldots, b_n]$. In one implementation, B may be constructed by differences between various expressions and a neutral face, and thus each column $b_i$ in B indicates a difference between an expression and a neutral face. The expression coefficient vector e may contain multiple weight coefficients that correspond to the multiple blendshapes in B respectively, and may be represented as $e=[e_1, \ldots, e_n]$, wherein $e_i$ should lie in the range of [0, 1]. The rigid rotation quaternion R may be used for indicating rotation information of the 3D facial mesh, and the rigid translation vector T may be used for indicating translation information of the 3D facial mesh. Depending on various implementations, B, e, R and T may have various dimensions. For example, in one implementation, B may be a 10000×46 matrix, e may be a 1×46 vector, R may be a 4×1 quaternion, and T may be a 1×3 vector.

The blendshape basis matrix B corresponding to the person in the face image may be derived by use of any 3D facial expression databases. For example, in one implementation, a 3D facial expression database named FaceWarehouse may be used, which provides data of 150 individuals from various ethnic backgrounds. The blendshape basis matrix B of a certain person may be constructed as:

$$B = \tau x_2 u^T \qquad \text{Equation (2)}$$

where $\tau$ is a multilinear tensor model, $x_2$ is a tensor product, and u is a user identity vector of the person in the face image. Depending on various implementations, $\tau$ and u may have various dimensions. For example, in the case that 50 eigen vectors are derived from individual data of a 3D facial expression database by use of a Principle Components Analysis (PCA) method, $\tau$ may be a 10000×46×50 tensor, and u may be a 1×50 vector.

Based on the representation of the 3D facial mesh F described above, 2D facial landmarks for the face image may be represented by 3D vertices on the facial mesh. For example, in one implementation, a 2D facial landmark $s_k$ may be represented as:

$$s_k = \Pi_Q(F^{(v_k)}) + d_k \qquad \text{Equation (3)}$$

where $\Pi$ is a projection function, $\Pi_Q$ is a perspective projection operator which is parameterized by a projection matrix Q, $F^{(v_k)}$ is the k-th 3D vertex on the facial mesh F, and $d_k$ is a 2D displacement. A set of all 2D facial landmarks $\{s_k\}$ may be represented as S. A set of 2D displacement $\{d_k\}$ may be represented as a displacement vector D. Depending on various implementations, the parameters in Equation (3) may have various dimensions. For example, in one implementation, $s_k$ may be a 2×1 vector, $d_k$ may be a 2×1 vector, D may be a (73×2)×1 vector, $F^{(v_k)}$ may be a 3×1 vector, the facial mesh F may have 10000 vertices, and the projection matrix Q may be a 3×3 matrix.

It should be noted that, for internal 2D facial landmarks (such as, eyes and nose), corresponding 3D vertices may be pre-defined and fixed, while for 2D facial landmarks along a face contour, corresponding 3D vertices are not invariants. This is because the face contour part will change depending on 3D facial poses. In one implementation, the present disclosure proposes the following approach to obtain correct 3D vertices on the face contour part.

FIG. 1 illustrates an exemplary implementation for obtaining contour vertices according to an embodiment of the present disclosure. Firstly, as shown in FIG. 1 (a), a possible contour region may be manually labeled by drawing polylines on a facial mesh. Next, for each polyline, if at least one point is visible, the most external visible point may be taken as a contour point. Otherwise, the most inner point may be taken as a contour point. Then, all the contour points may be linked to form a dense contour point line. FIG. 1 (b) shows a dense contour point line which is formed by the left contour point line 101 and the right contour point line 102. It can be seen that the left contour point line 101 is formed by linking the most external visible points in the left part of the face, while the right contour point line 102 is formed by linking the most inner points in the right part of the face. FIG. 1 (c) shows the right contour point line 102 in another view. After forming the dense contour point line, the dense contour point line may be uniformly sampled so as to obtain contour vertices that correspond to 2D facial landmarks along the face contour.

In Equation (3), a projection matrix Q is introduced, which may indicate attribute information about the RGB video camera. In one implementation, the projection matrix Q may be represented as:

$$Q = \begin{pmatrix} FL & 0 & p_0 \\ 0 & FL & q_0 \\ 0 & 0 & 1 \end{pmatrix} \qquad \text{Equation (4)}$$

where FL is a focal length of the camera, and $(p_0, q_0)$ is an image center point.

From the above Equations (1) to (4), 2D facial landmarks S may be treated as a function of corresponding 3D facial vertices which depends on Q, u, e, R, T and D, as follows:

$$Y_{(Q,u,e,R,T,D)} = S \qquad \text{Equation (5)}$$

where $Y$ is a mapping function for mapping 3D face representation parameters (such as, Q, u, e, R, T and D) to 2D facial landmarks.

It should be noted that Q and u are usually invariant across all face images for the same person and the same video camera. Thus, Q and u may be solved beforehand and may not be involved in the regression. The solving of Q and u will be explained later. Considering that Q and u are invariant, the remaining unknown variables in Equation (5) may be defined as a shape vector P=(e, R, T, D). Thus, the 3D face representation parameters may be construed as including Q, u and P. The dimension of P depends on the dimensions of e, R, T and D. For example, in the case that e is a 1×46 vector, R is a 4×1 quaternion, T is a 1×3 vector, and D is a (73×2)×1 vector, then P may be, such as, a (46+4+3+73×2)×1 vector.

According to various implementations of the present disclosure, a local feature regression may be applied during real-time 3D face tracking. For example, in one implementation, the local feature regression may be generally represented as:

$$LF(I,Q,u,P^{in}) = P_{raw}^{out} \qquad \text{Equation (6)}$$

where I is an input face image, $P^{in}$ is an input shape vector from a preceding face image, and $P_{raw}^{out}$ is an output shape vector corresponding to the input face image.

As mentioned above, Q and u may be solved before performing the local feature regression. An initial input face image of a certain person to be tracked may be used for solving Q and u. For example, in one implementation, initial 2D facial landmarks $S_0$ may be detected from the initial input face image by use of any 2D face alignment techniques. Then, Q and u may be obtained from the following equation:

$$\operatorname*{argmin}_{Q,u,e,R,T} \| \Upsilon(Q, u, e, R, T, 0) - S_0 \|^2 \qquad \text{Equation (7)}$$

Based on Equation (7), through minimizing the expression therein, Q and u may be obtained. It can be seen that, e, R and T are also obtained from Equation (7). Thus, in the case of assuming D=0, an initial $P_0$ is also determined accordingly.

Various approaches may be adopted to solve Equation (7). For example, in one implementation, image width may be used as an initial focal length for solving Q, then a binary search approach may be applied on the initial focal length to find candidate focal lengths. The candidate focal lengths may be used in turn for determining the Q that minimizing fitting errors of the expression in Equation (7). With a determined Q, if fixing u as a mean, ū, of user identity coefficients in a facial expression database and fixing e as the weight coefficient, $e_0$, for a neutral face, then R and T may be solved from Equation (7), and vice versa.

After solving Q and u according to Equation (7), they may be used as known invariants in the local feature regression. The following regression equation is transformed from Equation (6):

$$LFR(I,Q,u,P^{t-1}) = P_{raw}^{t} \qquad \text{Equation (8)}$$

where $P^{t-1}$ denotes the shape vector of the preceding face image, and $P_{raw}^{t}$ denotes the shape vector that is obtained for the face image.

Based on the above local feature regression, all 3D face representation parameters may be obtained for the face image, and accordingly, these parameters may be used for constructing the 3D facial mesh.

According to some implementations of the present disclosure, the shape vector $P^t$ obtained in the above process may be further refined. For example, these implementations may effectively ensure that the expression coefficient vector e may lie in a valid range, such as, [0, 1], thus facilitating to obtain a undistorted constructed 3D face. Moreover, these implementations may take temporal smoothness of the obtained shape vector into account, thus facilitating to display 3D faces without, such as, jittering problems among a set of frames.

For example, in one implementation of the present disclosure, an alternative post-processing may be performed after the local feature regression process. In the post-processing, the expression coefficient vector may be ensured to lie into a valid range of [0, 1], and a post-processed shape vector being temporally smoothed may be obtained. Various approaches may be adopted to implement the post-processing. For example, in one implementation, post-processing may be represented by the following equations:

$$S_{raw}^{t} = \Upsilon(Q, u, P_{raw}^{t}) \qquad \text{Equation (9)}$$

$$\operatorname*{argmin}_{e^t,R^t,T^t} (\| \Upsilon(Q, u, e^t, R^t, T^t, 0) - S_{raw}^{t} \|^2 + \qquad \text{Equation (10)}$$
$$w_{smoothZ} \| T^t[2] - T^{t-1}[2] \|)$$

$$D^t = S_{raw}^{t} - \Upsilon(Q, u, e^t, R^t, T^t, 0) \qquad \text{Equation (11)}$$

$$P^t = (e^t, R^t, T^t, D^t) \qquad \text{Equation (12)}$$

In Equation (9), $P_{raw}^{t}$ denotes the shape vector outputted by the local feature regression. The first term in Equation (10) may be solved by applying a boundary constraint to force e to lie in the range of [0, 1]. For example, a gradient-based solver "LBGFS-B" may be used for the first term. The second term in Equation (10) is used to handle ambiguity of the rigid translation vector T in the Z-direction. For example, a bilateral filter may be applied for the second term, wherein the bilateral filter is a non-linear, edge-preserving and noise-reducing smoothing filter for images. Through Equations (9) to (11), a post-processed shape vector $P^t$ may be finally obtained in Equation (12).

According to an embodiment of the present disclosure, after the local feature regression and the alternative post-processing are performed, a mechanism for determining new representative frames and updating the user identity vector u may be alternatively conducted.

In one implementation, if an expression in a face image is extreme and the minimum difference between the expression and preceding expressions is higher than a threshold, this face image may be construed as a new representative frame. For example, if expression coefficients of the face image are sufficiently distant from a linear space formed by existing face images, this face image may be determined as a new representative frame. The new representative frame may be further used for updating the user identity vector u. For example, in one implementation, an updated user identity vector u may be obtained by minimizing the following equation:

$$\operatorname*{argmin}_{u,e^k,R^k,T^k} \sum_k \| \Upsilon(Q, u, e^k, R^k, T^k, 0) - S^k \|^2 \qquad \text{Equation (13)}$$

The updated user identity vector u obtained from Equation (13) may be used for the following local feature regression. Thus, the present disclosure may achieve a more accurate 3D face tracking through updating the user identity vector during the local feature regression.

Various implementation approaches may be adopted by the present disclosure to perform the local feature regression. For example, in one implementation, the local feature regression may be based on a standard random forest. It should be noted that the following disclosure involving a random forest only intends to explain some exemplary technical details of some embodiments of the present disclosure, but does not intend to limit the present disclosure in any way.

Figure 2:
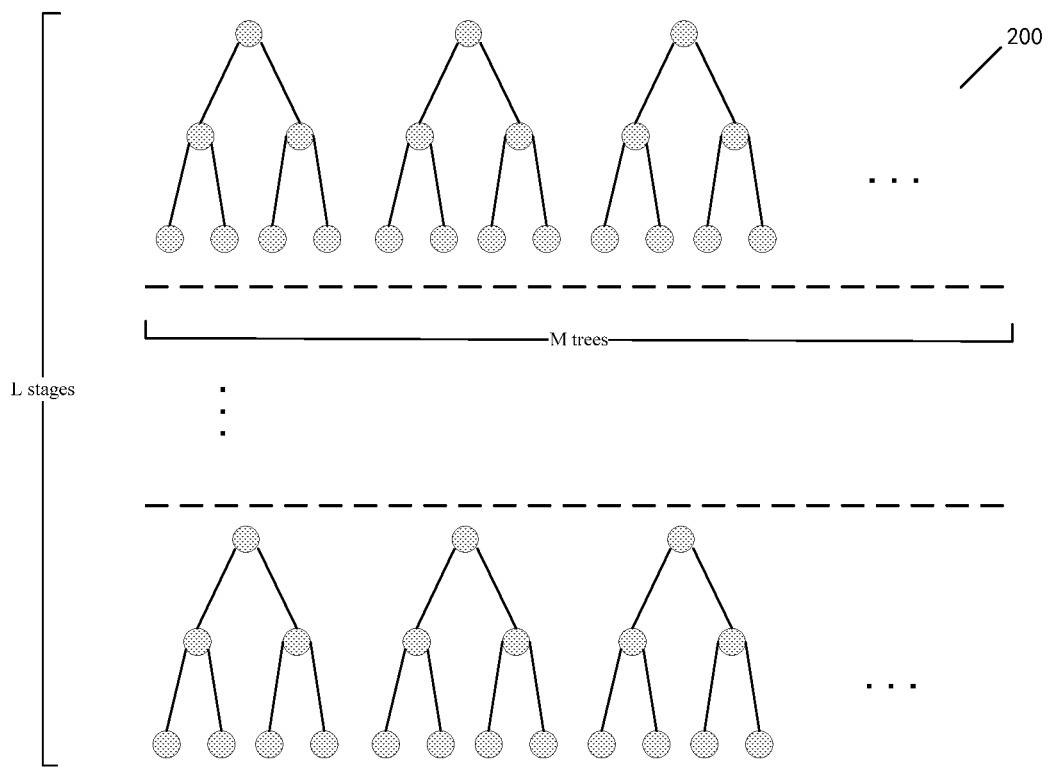
FIG. 2 illustrates an exemplary local feature regression forest according to an embodiment of the present disclosure.

FIG. 2 illustrates an exemplary local feature regression forest 200 according to an embodiment of the present disclosure. As shown in FIG. 2, the local feature regression forest 200 may comprise a number of L regression stages, and each stage may comprise a number of M regression trees. Each regression tree is a binary decision tree.

Figure 3:
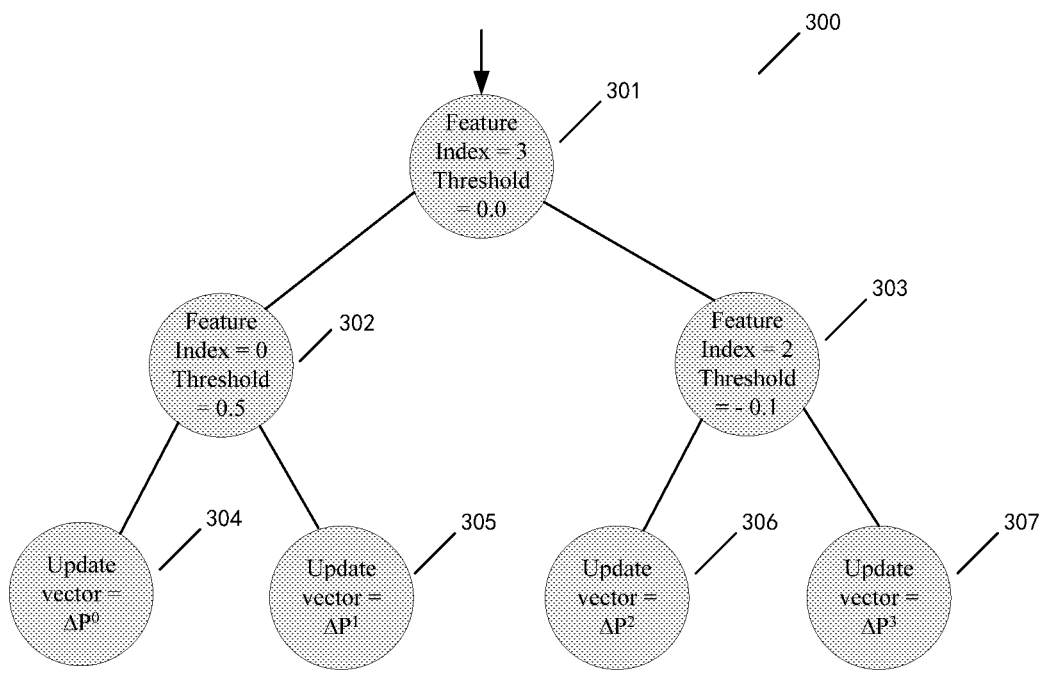
FIG. 3 illustrates an exemplary configuration of a regression tree in a local feature regression forest according to an embodiment of the present disclosure.

FIG. 3 illustrates an exemplary configuration of a regression tree 300 in a local feature regression forest according to an embodiment of the present disclosure.

The regression tree 300 may be one of the M regression trees in the local feature regression forest 200 in FIG. 2. As shown in FIG. 3, the regression tree 300 may comprise non-leaf nodes 301~303 and leaf nodes 304~307. Each of the non-leaf nodes 301~303 is set a feature index and a threshold. For example, at the non-leaf node 303, the feature index is set to 2, and the threshold is set to −0.1. Moreover, each of the leaf nodes 304~307 is assigned an update vector. For example, at the leaf node 305, the update vector is assigned as $\Delta P^1$. It should be noted that the regression tree 300 shown in FIG. 3 is only an example, and regression trees according to the present disclosure are not limited to the configuration of the regression tree 300 (including, such as, the number of the non-leaf or leaf nodes, feature indices and thresholds set in the non-leaf nodes, and update vectors assigned for the leaf nodes).

Regression input for the regression tree 300 is a local feature vector $f^i$, where i is an index of an input face image. $f^i$ is used to represent local features and may be obtained from sample points around a landmark corresponding to the regression tree 300. The obtaining of $f^i$ will be explained later.

During a single tree regression process, depending on feature indices and thresholds set at the non-leaf nodes, the input local feature vector may be passed from the root node to one of the leaf nodes, and an update vector may be returned by the mapped leaf node.

The regression tree 300 may be expressed by a mapping function $\varnothing_j(f^i)$ (wherein j is the index of the regression tree 300) and a regression function $\Gamma(\varnothing_j, f^i)$.

The mapping function may map the local feature vector to one leaf node of the regression tree 300. Accordingly, the output of the mapping function $\varnothing_j(f^i)$ may be a binary vector indicating the index of the mapped leaf node. For example, in one implementation, when traversing in the regression tree 300 reaches a certain non-leaf node, a feature value in the input local feature vector $f^i$, which is indexed by a feature index set at this non-leaf node, is compared with a threshold set at this non-leaf node. If the feature value is less than the threshold, the traversing would go to, such as, the left child node, otherwise, the traversing would go to, such as, the right child node. In this way, the traversing would finally reach one of the leaf nodes 304~307. Assuming, the local feature vector is mapped to the leaf node 305, the output of the mapping function $\varnothing_j(f^i)$ may be [0 1 0 0], where "1" denotes the mapped leaf node 305.

The output of the regression function $\Gamma(\varnothing_j, f^i)$ may be an update vector assigned for the mapped leaf node. For example, if the local feature vector is mapped to the leaf node 305 and the leaf node 305 is assigned an update vector $\Delta P^1$, the output of the regression function $\Gamma(\varnothing_j, f^i)$ may be $\Delta P^1$.

The following example is provided in order to facilitate to understand the whole regression process of a single regression tree. An exemplary local feature vector $f^i$=[0.3, 0.5, −0.2, 0.1] is inputted to the regression tree 300, where feature indices of the feature values "0.3", "0.5", "−0.2" and "0.1" in $f^i$ are 0, 1, 2 and 3 respectively. It should be noted that the number of feature values contained in $f^i$ and all the feature values in $f^i$ are exemplary.

At the node 301, the feature index has been set to 3, and the threshold has been set to 0.0. Since $f^i$[3]=0.1 and it is higher than the threshold 0.0, the traversing goes to the right child node 203. At the node 303, the feature index is set to 2, and the threshold is set to −0.1. Since $f^i$[2]=−0.2 and it is less than the threshold −0.1, the traversing goes to the left child node 306. The leaf node 306 is assigned an update vector $\Delta P^2$. Thus, in this example, the output of the mapping function $\varnothing_j(f^i)$ is [0 0 1 0], and the output of the regression function $\Gamma(\varnothing_j, f^i)$ is $\Delta P^2$.

A single tree regression process has been explained above in connection with FIG. 3. The following Table 1 will show an exemplary general local feature regression flow by the whole local feature regression forest. It should be noted that all the steps in Table 1 are merely exemplary, and the present disclosure is not limited to any steps in Table 1 or the sequence order of these steps, and should cover all other equivalents under the same or similar concepts.

TABLE 1

| Local Feature Regression |
|---|
| Input: current face image I, initial shape vector $P_0$ |
| Output: shape vector $P_{out}$ |
| 1.1  Current shape vector $P_{cur} \leftarrow P_0$ |
| 1.2  For l = 0 to L−1 |
| 1.3      $f^i \leftarrow$ DeriveFeature(I,$P_{cur}$,Q) //Derive local feature vector from current face image I |
| 1.4      For m = 0 to M−1 |
| 1.5          $\Delta P \leftarrow \Gamma(\varnothing_{l,m}, f^i)$ //Get an update vector by a regression tree |
| 1.6          $P_{cur} \leftarrow P_{cur} + \Delta P$ |
| 1.7  $P_{out} \leftarrow P_{cur}$ |

In one implementation, the local feature regression by the local feature regression forest may finally obtain a derived shape vector by use of a current shape vector and update vectors outputted by all the regression trees in the regression forest.

At step 1.1, an initial shape vector $P_0$ is assigned to the current shape vector $P_{cur}$. Step 1.2 regulates iterations across a number of L regression stages. At step 1.3, the local feature vector $f^i$ is obtained by a function of DeriveFeature(I, $P_{cur}$, Q) which may derive a local feature vector from the current face image and will be explained later. At steps 1.4 to 1.6, the current shape vector $P_{cur}$ is updated by adding with all update vectors outputted by a number of M regression trees in a certain regression stage 1. At step 1.7, a derived shape vector $P_{out}$ is finally obtained.

By referring to the above local feature regression flow, the regression behavior thereof may be represented in a mathematical form as:

$$P^l = P^{l-1} + \Delta P^l \quad \text{Equation (14)}$$

$$\Delta P^l = W^l \Phi^l(f^l) \quad \text{Equation (15)}$$

$$P_{out} = P^{L-1} = P^{L-2} + \Delta P^{L-1} \quad \text{Equation (16)}$$

where $\Phi^l=[\phi_{l,0}, \phi_{l,1}, \ldots, \phi_{l,M}]$ and $\Phi^l$ comprises a set of mapping functions that correspond to a number of M regression trees in a certain regression stage 1, and $W^l$ is a regression matrix. The column number of $W^l$ is equal to the number of leaf nodes in the regression stage 1, and each column of $W^l$ includes an update vector assigned for a corresponding one of the leaf nodes. According to Equations (14) and (15), a shape vector $P^l$ of the regression stage 1 may be obtained. Further, according to Equation (16), a shape vector $P_{out}$ outputted by the whole regression forest may be obtained.

As mentioned above in connection with Table 1, the local feature vector $f^i$ may be obtained from the current face image I. The following Table 2 shows an exemplary flow of obtaining the local feature vector. It should be noted that all the steps in Table 2 are merely exemplary, and the present disclosure is not limited to any steps in Table 2 or the sequence order of these steps, and should cover all other equivalents under the same or similar concepts.

TABLE 2

DeriveFeature

Input: current face image I, current shape vector $P_{cur}$, projection matrix Q, user identity vector u
Output: local feature vector f
2.1　S ← ϒ (Q,u,$P_{cur}$) // Map 3D face representation parameters to 2D facial landmarks
2.2　DstIndex ← 0
2.3　For k = 0 to lengthOf(S) − 1
2.4　　ρ ← Randomly sample X points in a circle which center is S[k] and radius is $\epsilon$
2.5　　$f_{raw}$ ← App(I,ρ) //Extract feature measurements from the current face image I
2.6　　For i = 0 to lengthOf($f_{raw}$) − 1
2.7　　　For j = i+1 to lengthOf($f_{raw}$) − 1
2.8　　　　f[DstIndex] ← $f_{raw}$[i] − $f_{raw}$[j]
2.9　　　　DstIndex ← DstIndex + 1

At step 2.1, 3D face representation parameters may be mapped to 2D facial landmarks according to, such as, Equations (3) and (5). At steps 2.2 and 2.9, indices of feature values in the local feature vector $f$ are defined and updated. Step 2.3 regulates iterations across a number of lengthOf(S) landmarks. Steps 2.4 to 2.9 regulate obtaining of a local feature vector for a certain landmark k. In one implementation, a local region may be defined for a landmark such that sample points may be further selected from this local region. The local region may be, such as, a circle with the center is the landmark. It should be noted that the local region may also have any other forms than a circle, if only it may define a definite region close to the landmark for selecting sample points therein. In the case of adopting a circle as the local region, the center of the circle may be denoted as S[k] and the radius thereof may be denoted as $\epsilon$. At step 2.4, a number of X sample points are randomly selected within the circle, and these sample points are denoted as ρ. For example, in one implementation, the value of X may be set to 50. At step 2.5, a function App(I, ρ) may be used for obtaining $f_{raw}$ which contains all the extracted feature measurements of the sample points. The function App(I, ρ) may be used for extracting feature measurements at the sample points ρ in the current face image I and may be implemented in various approaches. In one implementation, the extracted feature measurements may be intensities of the sample points. At steps 2.6 to 2.9, color differences between feature measurements of any two sample points are calculated, and thus the obtained local feature vector $f$ would contain these color differences as a set of feature values. For example, in one implementation, if the number X of the sample points is 50, then the number of the set of feature values contained in the local feature vector $f$ would be $C_{50}^2$.

In one implementation, the size of the local region corresponding to a certain landmark may gradually shrink from one stage to a following stage. For example, when adopting a circle as the local region, the radius $\epsilon$ of the circle may decrease as the stage increases. That is, sample points corresponding to a certain landmark would be selected in a smaller region when the local feature regression goes to a following stage.

In one implementation, considering that the size or shape of a face may change from frame to frame, the landmarks and sample points may be alternatively defined in a normalized coordinate.

In one implementation, a template 3D face image may be projected to a 2D image plane. The projected template face image may be normalized to a unit square. Accordingly, locations of facial landmarks and respective sample points for the projected template face image may be defined in a normalized coordinate, wherein, for each facial landmark, sample points may be randomly determined in its local region. When further face images are inputted, for example, a Moving Least Squares method may be used for deforming locations of the facial landmarks for the projected template face image to correspond to facial landmarks for the further face images, thus registering coordinates among different face images. Accordingly, for the facial landmarks after the deforming operation, respective sample points may be randomly determined in the further face images, and these sample points are also defined in a normalized coordinate.

As mentioned above, before performing the local feature regression, the nodes in the local feature regression forest should be configured. For example, feature indices and thresholds should be set at the non-leaf nodes, and update vectors should be assigned to the leaf nodes. Such configuration of the nodes in the local feature regression forest may be implemented by a training process.

The local feature regression forest may be trained by use of a set of training data. The training data may include, such as, training face images, guessed and ground truth shape vector pairs, etc. The training data may be obtained as follows.

Firstly, training face images may be obtained from any public resources, such as, from the FaceWarehouse database. Then, a number of, such as, 73 2D facial landmarks may be manually labeled on each face, denoted as $\{S^i\}$ (wherein i is the index of the face image). Further, according to the following equations, 3D face representation parameters may be solved to best fit $\{S^i\}$ by minimizing projection difference.

$$\underset{Q_g^i, u_g^i, e_g^i, R_g^i, T_g^i}{\operatorname{argmin}} \|\Upsilon(Q_g^i, u_g^i, e_g^i, R_g^i, T_g^i, 0) - S^i\|^2 \quad \text{Equation (17)}$$

$$D_g^i = S^i - \Upsilon(Q_g^i, u_g^i, e_g^i, R_g^i, T_g^i, 0) \quad \text{Equation (18)}$$

$$P_g^i = (e_g^i, R_g^i, T_g^i, D_g^i) \quad \text{Equation (19)}$$

For the face image $I^i$, the ground truth parameters $Q_g^i$, $u_g^i$, $e_g^i$, $R_g^i$, $T_g^i$ and $D_g^i$ may be obtained through Equations (17) to (19), wherein the ground truth shape vector $P_g^i = (e_g^i, R_g^i, T_g^i, D_g^i)$.

Various types of guess-truth training pairs may be constructed then. Here, $P^{ij}$ denotes a guess shape vector, and $P_g^{ij}$ denotes the ground truth shape vector, wherein j is an index of the guess-truth pair for the face image $I^i$. Moreover, $D_r^{ij}$ denotes a guess displacement vector that taken from a random face image. Some exemplary types of guess-truth training pairs are constructed below, but it should be noted that the present disclosure is not limited to these training pairs.

Random Rotation.
Add a random rotation $\Delta R^{ij}$, yielding $$P^{ij}=(e_g^i, R_g^i+\Delta R^{ij}, T_g^i, D_r^{ij}), P_g^{ij}=P_g^i.$$

Random Translation.
Add a random translation $\Delta T^{ij}$, yielding $$P^{ij}=(e_g^i, R_g^i, T_g^i+\Delta T^{ij}, D_r^{ij}), P_g^{ij}=P_g^i.$$

Random Expression.
Choose a random face image $I^{i'}$ and its corresponding expression coefficient vector $e^{ij}=e_g^{i'}$, yielding $$P^{ij}=(e^{ij}, R_g^i, T_g^i, D_r^{ij}), P_g^{ij}=P_g^i.$$

Random Identity.
Choose a random face image $I^{i'}$ and its corresponding user identity vector $u^{ij}=u_g^{i'}$, yielding $$P^{ij}=(e_g^i, R_g^i, T_g^i, D_r^{ij}), P_g^{ij}=(e_g^i, R_g^i, T_g^i, D_g^{ij}),$$

where $D_g^{ij}$ is a displacement vector recomputed with the new ground truth user identity vector.

Random Camera.
Add a random focal length offset $$\Delta Q^{ij} = \begin{bmatrix} \Delta FL^{ij} & 0 & 0 \\ 0 & \Delta FL^{ij} & 0 \\ 0 & 0 & 0 \end{bmatrix},$$

yielding $$P^{ij}=(e_g^i, R_g^i, T_g^i, D_r^{ij}), P_g^{ij}=(e_g^i, R_g^i, T_g^i, D_g^{ij}),$$

where $D_g^{ij}$ is a displacement vector recomputed with a new projection matrix $Q^{ij}=Q_g^i+\Delta Q^{ij}$.

After obtaining the training data as mentioned above, the training data may be further used for learning feature indices and thresholds for the non-leaf nodes in the local feature regression forest and learning update vectors for the leaf nodes in the local feature regression forest respectively.

The following Table 3 shows an exemplary flow for learning a feature index and a threshold for a single non-leaf node. It should be noted that all the steps in Table 3 are merely exemplary, and the present disclosure is not limited to any steps in Table 3 or the sequence order of these steps, and should cover all other equivalents under the same or similar concepts.

TABLE 3

LearnNonLeafNode

Input: N input training data G = ($f^i, \Delta P^i = P_g^i - P^i$)
Output: feature index $v_{best}$ and threshold $H_{best}$
3.1  V ← Randomly select Y feature indices in a range of [0, lengthOf($f^i$)]
3.2  $v_{best}$ ← −1, $H_{best}$ ← 0, $Gcore_{min}$ ← ∞
3.3  For v in V
3.4      $H_{cand}$ ← Determine a threshold by K-means
3.5      $G_{left}$, $G_{right}$ ← Split the N input training data G, if $f^i[v] < H_{cand}$, assigned to $G_{left}$, else assigned to $G_{right}$ TABLE 3-continued LearnNonLeafNode 3.6      $L_{var}$ ← Compute variance of $\Delta P^i$ in $G_{left}$
3.7      $R_{var}$ ← Compute variance of $\Delta P^i$ in $G_{right}$
3.8      Gcore ← $L_{var}$ * numberOf($G_{left}$) + $R_{var}$ * numberOf($G_{right}$)
3.9      If Gcore < $Gcore_{min}$
3.10         $v_{best}$ ← v, $H_{best}$ ← $H_{cand}$
3.11         $Gcore_{min}$ ← Gcore The flow shown in Table 3 intends to facilitate to make the ground truth shape vector increments mapped to the same leaf node are as similar as possible. Considering limited computation resources, Y candidate feature indices may be firstly randomly selected, and then the best one in these candidates may be determined for the non-leaf node. As for determination of the threshold of the non-leaf node, a K-means method may be used, wherein the training data may be classified into two clusters, and the mean value of centers of the two clusters may be determined as the threshold.

Table 3 defines a number of N input training data G, where $G=(f^i, \Delta P^i=P_g^i-P^i)$, $f^i$ is a local feature vector obtained from a face image $I^i$, and $\Delta P^i$ is a ground truth shape vector increment which may be obtained from a pair of guess-truth training shape vectors. At step 3.1, Y feature indices may be randomly selected in a range of [0, lengthOf($f^i$)]. At step 3.2, initial values are assigned to the best feature index variable $v_{best}$, the best threshold variable $H_{best}$ and the minimum decision variable $Gcore_{min}$ respectively. Step 3.3 regulates iterations across the Y feature indices in V. At step 3.4, a candidate threshold $H_{cand}$ is determined by use of the K-means method. At step 3.5, the N input training data G are split into two clusters $G_{left}$ and $G_{right}$ by comparison with the candidate threshold $H_{cand}$. In one implementation, for a certain input training data, if its $f^i[v]<H_{cand}$, this input training data will be assigned to $G_{left}$, else assigned to $G_{right}$. At steps 3.6 to 3.7, variances of $\Delta P^i$ in $G_{left}$ and $G_{right}$, i.e., $L_{var}$ and $R_{var}$, are computed respectively. At step 3.8, a decision variable Gcore is obtained based on the $L_{var}$ and $R_{var}$ as well as the numbers of input training data in $G_{left}$ and $G_{right}$. At steps 3.9 to 3.11, depending on the comparison between Gcore and $Gcore_{min}$, the values of $v_{best}$, $H_{best}$ and $Gcore_{min}$ are updated respectively.

Through the flow of Table 3, a feature index and a threshold may be learned for a single non-leaf node. The following Table 4 shows an exemplary general flow for learning all non-leaf nodes of a tree. It should be noted that all the steps in Table 4 are merely exemplary, and the present disclosure is not limited to any steps in Table 4 or the sequence order of these steps, and should cover all other equivalents under the same or similar concepts.

TABLE 4

LearnTree

Input: N input training data G = ($f^i, \Delta P^i = P_g^i - P^i$)
Output: a tree Ψ
4.1  $G_0$ ← G    // N input training data G for the root node
4.2  For j = all indices of non-leaf nodes
4.3      $v_j, H_j$ ← LearnNonLeafNode ($G_j$)
4.4      j__left, j__right ← Get child indices of the current node j
4.5      $G_{j\_left}$, $G_{j\_right}$ ← Split input training data $G_j$, if $f^i[v_j] < H_j$, assigned to $G_{j\_left}$, else assigned to $G_{j\_right}$ At step 4.1, the N input training data G is used as input to the root node of the tree. Step 4.2 regulates iterations across all indices of non-leaf nodes of the tree. In one implementation, all the non-leaf nodes of the tree may be indexed, such as, in a Breadth First Search (BFS) order. At step 4.3, a feature index $v_j$ and a threshold $H_j$ are learned for the j-th non-leaf node through the function of LearnNonLeafNode ($G_j$) as shown in Table 3, wherein $G_j$ is input training data for the j-th non-leaf node. At step 4.4, indices of the left and right child nodes of the current j-th non-leaf node, i.e, j_left and j_right, are determined respectively. At step 4.5, input training data for the j_left-th and j_right-th nodes, i.e., $G_{j\_left}$ and $G_{j\_right}$, are determined respectively, through splitting the input training data $G_j$ in a similar way as step 3.5 in Table 3.

Through the flow of Table 4 in connection with the flow of Table 3, feature indices and thresholds may be learned for all non-leaf nodes of a tree.

As for the learning of update vectors for leaf nodes, in one implementation, a global optimization may be applied to find best update vectors for the leaf nodes. An objective function may be represented as:

$$\underset{W^l}{\operatorname{argmin}} \sum_{i=0}^{N-1} \|\Delta P_g^{l,i} - W^l \Phi^l(I^i, P^{l-1,i}, Q^i)\|_2^2 + \lambda \|W^l\|_2^2 \quad \text{Equation (20)}$$

where i is the index of input face image, l is the index of regression stage, and $\Delta P_g^{l,i}$ is a ground truth shape vector increment. The first term in Equation (20) is the regression target, and the second term is a L2 regularization on $W^l$, where $\lambda$ controls the regularization strength. The second term is used to avoid overfitting. Since what is solves here is a large-sparse linear system, a Dual Coordinate Descent method may be used to solve it. The obtained $W^l$ is a collection of update vectors of all the leaf nodes in the l-th regression stage, wherein each column of $W^l$ is an update vector assigned to a corresponding leaf node. The above Equation (20) may be named as LearnUpdateVectors for convenience.

Based on all the above learning processes for non-leaf and leaf nodes, the following Table 5 shows an exemplary general flow for learning a whole local feature regression forest. It should be noted that all the steps in Table 5 are merely exemplary, and the present disclosure is not limited to any steps in Table 5 or the sequence order of these steps, and should cover all other equivalents under the same or similar concepts.

TABLE 5

LearnForest

Input: N input training data G = ($I^i, P^i, P_g^i, Q^i$)
Output: Local Feature Regression Forest ($\Phi$, W)
5.1  For i = 0 to N−1
5.2      $P_{cur}[i] \leftarrow P^i$
5.3  For l = 0 to L−1   // Number of regression stages
5.4      For i = 0 to N−1 //For each input face image
5.5          flist[i]$^l$ ← DeriveFeature ($I^i, P_{cur}^i, Q^i$) //Derive local feature vectors
5.6      For m = 0 to 73−1   // Number of facial landmarks
5.7          For c = 0 to 4   // Build 5 trees for each facial landmark
5.8              $\hat{m} \leftarrow \hat{m} \times 5 + c$ // Index of a tree
5.9              $\emptyset \text{list}^l[\hat{m}]$ ← LearnTree (flist$^l$, $P_{cur}, P_g$)  // Learn best feature indices and thresholds for non-leaf nodes to build a tree
5.10     $W^l$ ← LearnUpdateVectors ($P_{cur}, P_g, \emptyset \text{list}^l$) //Learn update vectors for leaf nodes
5.11     For i = 0 to N−1
5.12         $P_{cur}[i] \leftarrow P_{cur}[i] + W^l \Phi^l(I^i, P_{cur}[i], Q^i)$   //Update shape vectors Table 5 defines a number of N input training data G, where G=($I^i, P^i, P_g^i, Q^i$), and i is the index of input face image. At steps 5.1 to 5.2, a current shape vector $P_{cur}[i]$ for each input face image i is assigned an initial shape vector. Step 5.3 regulates iterations across a number of L regression stages in the regression forest. At steps 5.4 to 5.5, a local feature vector flist[i]$^l$ is determined for each input face image i, wherein the function of DeriveFeature as shown in Table 2 is called. At steps 5.6 to 5.8, indices of all the trees in the l-th regression stage are determined. Here, it should be noted that, although, in Table 5, the number of facial landmarks is set to 73 and the number of trees built for each facial landmark is set to 5, these numbers are merely exemplary and alternative, and they may have any other values based on various needs and designs. For example, it is also applicable to only build one tree for each facial landmark. At step 5.9, indices and thresholds for non-leaf nodes in the tree $\hat{m}$ are learned, wherein the function of LearnTree as shown in Table 4 is called. Through step 5.9, a mapping function $\emptyset$ of each tree in the l-th regression stage may be obtained respectively, and accordingly, a set of these mapping functions $\Phi^l$ is also determined. At step 5.10, update vectors for all leaf nodes in the l-th regression stage, i.e, $W^l$, may be learned, wherein the function of LearnUpdateVectors that is based on Equation (20) is called. At steps 5.11 to 5.12, the obtained $W^l$ and $\Phi^l$ are used for updating the current shape vector $P_{cur}[i]$ for each input face image i.

As mentioned above, through the flow of Table 5, a whole local feature regression forest may be learned. Now, this local feature regression forest may be used for performing the local feature regression in connection with the flow shown in Table 1.

Figure 4:
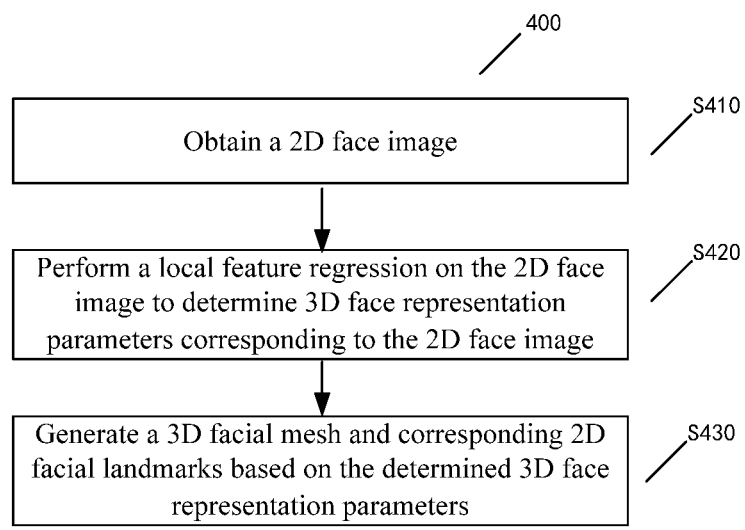
FIG. 4 is a flowchart of an exemplary method for 3D face tracking according to an embodiment of the present disclosure.

FIG. 4 is a flowchart of an exemplary method 400 for 3D face tracking according to an embodiment of the present disclosure.

At S410, a 2D face image may be obtained.

At S420, a local feature regression may be performed on the 2D face image to determine 3D face representation parameters corresponding to the 2D face image.

In one implementation, performing the local feature regression may comprise utilizing 3D face representation parameters corresponding to a preceding 2D face image as initial input parameters for the local feature regression.

In one implementation, the determined 3D face representation parameters may comprise a projection matrix Q, a user identity vector u and a shape vector P. The shape vector P may comprise an expression coefficient vector e, a rigid rotation quaternion R, a rigid translation vector T and a displacement vector D. The 3D face representation parameters may be further used for representing a 3D facial mesh according to a 3D face representation model, and for facilitating to determine corresponding 2D facial landmarks.

In one implementation, performing the local feature regression may comprise performing the regression based on a random forest as shown in FIG. 2. The random forest may comprise a plurality of regression stages. Each regression stage may comprise a plurality of regression trees. At least one regression tree in each stage may correspond to a landmark.

Regression input for each of the at least one regression tree may be a local feature vector obtained from a local region for the stage of the landmark. Alternatively, the local region for the stage of the landmark may be a circle with the landmark as its center point, the radius of the circle being decreased as the stage being increased. An output of each regression tree may be an update vector from one of leaf nodes of the regression tree.

In one implementation, the local feature vector may comprise color differences between any two sampling points in the local region for the stage of the landmark. Alternatively, the sampling points may be defined in a normalized coordinate by using, such as, Moving Least Squares.

In one implementation, the random forest may be trained by a set of training data. When training the random forest, a feature index and a threshold may be determined for each non-leaf node, and an update vector may be determined for each leaf node.

In one implementation, a shape vector of a preceding 2D face image and update vectors from the regression trees in the random forest may be used by the local feature regression to derive an outputted shape vector.

In one implementation, the outputted shape vector may be used for generating the 3D facial mesh from a blendshape basis matrix B.

Alternatively, a post-processing may be performed on the outputted shape vector. Through the post-processing, the expression coefficient vector e may be located into a valid range, and/or a post-processed shape vector which has been temporally smoothed may be obtained.

In one implementation, after performing the post-processing, a user identity vector u may be updated.

In one implementation, each of the 2D facial landmarks may be projected by a corresponding vertex on the 3D facial mesh. In this case, contour vertices corresponding to 2D facial landmarks along a face contour may be determined through: labeling a possible contour region by drawing polylines on the 3D facial mesh; for each polyline, selecting the most external or inner point as a contour point based on whether at least one point in the polyline is visible; linking all the contour points to form a dense contour point line; and uniformly sampling the dense contour point line so as to obtain the contour vertices.

At S430, a 3D facial mesh and corresponding 2D facial landmarks may be generated based on the determined 3D face representation parameters.

Figure 5:
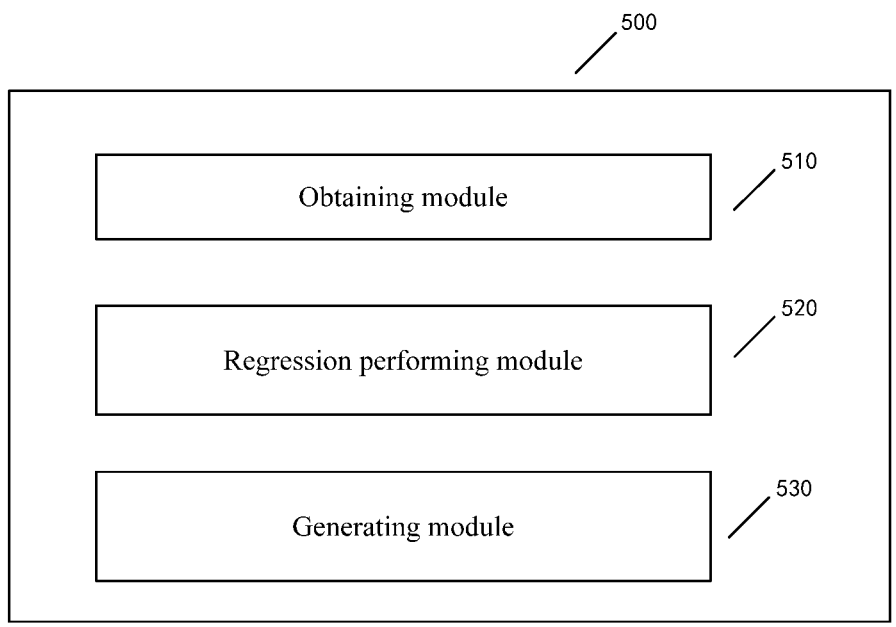
FIG. 5 illustrates an exemplary apparatus for 3D face tracking according to an embodiment of the present disclosure.

FIG. 5 illustrates an exemplary apparatus 500 for 3D face tracking according to an embodiment of the present disclosure.

The apparatus 500 may comprise: an obtaining module 510 for obtaining a 2-dimension (2D) face image; a regression performing module 520 for performing a local feature regression on the 2D face image to determine 3D face representation parameters corresponding to the 2D face image; and a generating module 530 for generating a 3D facial mesh and corresponding 2D facial landmarks based on the determined 3D face representation parameters.

In one implementation, the regression performing module 520 may be further configured for performing the regression based on a random forest. The random forest may comprise a plurality of regression stages. Each regression stage may comprise a plurality of regression trees. At least one regression tree in each stage may correspond to a landmark. Regression input for each of the at least one regression tree may be a local feature vector obtained from a local region for the stage of the landmark. An output of each regression tree may be an update vector from one of leaf nodes of the regression tree.

In one implementation, the local region for the stage of the landmark may be a circle with the landmark as its center point, the radius of the circle being decreased as the stage being increased.

In one implementation, the local feature vector may comprise color differences between any two sampling points in the local region for the stage of the landmark. The sampling points may be defined in a normalized coordinate by using, such as, Moving Least Squares.

In one implementation, an output of each tree may be an update vector from one of leaf nodes of the tree. A shape vector may be outputted by the local feature regression. The outputted shape vector may be derived from a shape vector of a preceding 2D face image and update vectors outputted by the regression trees in the random forest.

In one implementation, the apparatus 500 may further comprise a post-processing performing module for performing post-processing on the outputted shape vector to locate the expression coefficient vector e into a valid range and/or to obtain a post-processed shape vector being temporally smoothed.

In one implementation, the apparatus 500 may further comprise an updating module for updating a user identity vector u after the post-processing.

Moreover, the apparatus 500 may also comprise any other modules configured for implementing functionalities corresponding to any steps of the method for 3D face tracking according to the present disclosure.

Figure 6:
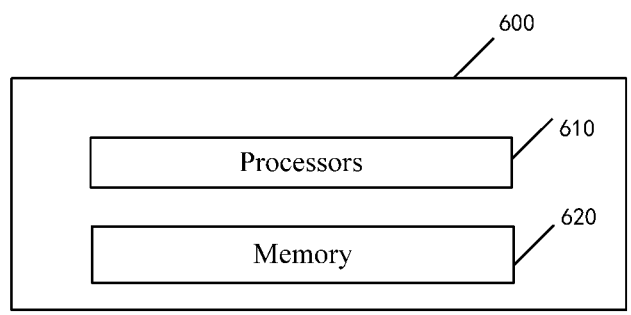
FIG. 6 illustrates an exemplary system for 3D face tracking according to an embodiment of the present disclosure.

FIG. 6 illustrates an exemplary system 600 for 3D face tracking according to an embodiment of the present disclosure. The system 600 may comprise one or more processors 610. The system 600 may further comprise a memory 620 that is connected with the one or more processors. The memory 620 may store computer-executable instructions that, when executed, cause the one or more processors to perform any steps of the method for 3D face tracking according to the present disclosure.

The solution of the present disclosure may be embodied in a non-transitory computer-readable medium. The non-transitory computer-readable medium may comprise instructions that, when executed, cause one or more processors to perform any steps of the method for 3D face tracking according to the present disclosure.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

It is to be understood that the order of steps in the methods disclosed is an illustration of exemplary processes. Based upon design preferences, it is understood that the order of steps in the methods may be rearranged.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for 3-dimension (3D) face tracking, comprising:
   obtaining a 2-dimension (2D) face image;
   performing a local feature regression on the 2D face image, using a plurality of regression trees of a random forest, to determine 3D face representation parameters corresponding to the 2D face image, the random forest comprising a plurality of regression stages, wherein a regression stage comprises the plurality of regression trees, wherein a regression tree in the regression stage corresponds to a landmark, wherein regression input for the regression tree includes a local feature vector obtained from a local region for the regression stage of the landmark, and wherein regression output of the regression tree includes an update vector from a leaf node of the regression tree; and
   generating a 3D facial mesh and corresponding 2D facial landmarks based on the determined 3D face representation parameters.

2. The method of claim 1, wherein performing the local feature regression comprises:
   utilizing 3D face representation parameters corresponding to a preceding 2D face image as initial input parameters for the local feature regression.

3. The method of claim 1, wherein the determined 3D face representation parameters comprise a projection matrix Q, a user identity vector u and a shape vector P, and the shape vector P comprises an expression coefficient vector e, a rigid rotation quaternion R, a rigid translation vector T and a displacement vector D.

4. The method of claim 1, wherein each regression stage comprising a respective plurality of regression trees, at least one regression tree in each stage corresponding to a respective landmark, regression input for each of the at least one regression tree being a respective local feature vector obtained from a local region for a respective stage of the respective landmark, and an output of each regression tree is a respective update vector from one of leaf nodes of each of the regression trees.

5. The method of claim 1, wherein the local region for the stage of the landmark is a circle with the landmark as its center point, the radius of the circle being decreased as the stage being increased.

6. The method of claim 1, wherein the local feature vector comprises color differences between any two sampling points in the local region for the stage of the landmark.

7. The method of claim 6, wherein the sampling points are defined in a normalized coordinate by using Moving Least Squares.

8. The method of claim 1, wherein a shape vector is outputted by the local feature regression, the outputted shape vector being derived from a shape vector of a preceding 2D face image and update vectors outputted by the regression trees in the random forest.

9. The method of claim 8, wherein generating the 3D facial mesh comprises:
   generating the 3D facial mesh from a blendshape basis matrix B based on the outputted shape vector.

10. The method of claim 8, further comprises:
    performing post-processing on the outputted shape vector to locate the expression coefficient vector e into a valid range and/or to obtain a post-processed shape vector being temporally smoothed.

11. The method of claim 10, further comprising:
    updating a user identity vector u after the post-processing.

12. An apparatus for 3-dimension (3D) face tracking, comprising:
    a processor; and
    a memory, storing computer-executable instructions that, when executed, cause the processor to perform operations including:
    obtaining a 2-dimension (2D) face image;
    performing a local feature regression on the 2D face image, using a plurality of regression trees of a random forest, to determine 3D face representation parameters corresponding to the 2D face image, the random forest comprising a plurality of regression stages, wherein a regression stage comprises the plurality of regression trees, wherein a regression tree in the regression stage corresponds to a landmark, wherein regression input for the regression tree includes a local feature vector obtained from a local region for the regression stage of the landmark, and wherein regression output of the regression tree includes an update vector from a leaf node of the regression tree; and
    generating a 3D facial mesh and corresponding 2D facial landmarks based on the determined 3D face representation parameters.

13. The apparatus of claim 12, wherein each regression stage comprising a respective plurality of regression trees, at least one regression tree in each stage corresponding to a respective landmark, regression input for each of the at least one regression tree being a respective local feature vector obtained from a local region for a respective stage of the respective landmark, and an output of each regression tree is a respective update vector from one of leaf nodes of each of the regression trees.

14. The apparatus of claim 12, wherein the local region for the stage of the landmark is a circle with the landmark as its center point, the radius of the circle being decreased as the stage being increased.

15. The apparatus of claim 12, wherein the local feature vector comprises color differences between any two sampling points in the local region for the stage of the landmark.

16. The apparatus of claim 15, wherein the sampling points are defined in a normalized coordinate by using Moving Least Squares.

17. The apparatus of claim 12, wherein a shape vector is outputted by the local feature regression, the outputted shape vector being derived from a shape vector of a preceding 2D face image and update vectors outputted by the regression trees in the random forest.

18. The apparatus of claim 17, wherein the operations further cause the processor to perform operations comprising:
performing post-processing on the outputted shape vector to locate the expression coefficient vector e into a valid range and/or to obtain a post-processed shape vector being temporally smoothed.

19. The apparatus of claim 18, wherein the instructions further cause the processor to perform operations comprising:
an updating module for updating a user identity vector u after the post-processing.

* * * * *